US008714574B2

(12) United States Patent
Glanzer et al.

(10) Patent No.: US 8,714,574 B2
(45) Date of Patent: May 6, 2014

(54) INDEPENDENT WHEEL SUSPENSION OF AN AT LEAST SLIGHTLY STEERABLE REAR WHEEL OF A DOUBLE-TRACK VEHICLE

(71) Applicant: Bayerische Motoren Werke Aktiengesellschaft, Munich (DE)

(72) Inventors: Michael Glanzer, Munich (DE); Hubert Scholz, Munich (DE); Ludwig Seethaler, Hebertshausen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 14/052,171

(22) Filed: Oct. 11, 2013

(65) Prior Publication Data
US 2014/0035251 A1 Feb. 6, 2014

Related U.S. Application Data

(63) Continuation of application No. PCT/EP2012/058249, filed on May 4, 2012.

(30) Foreign Application Priority Data

Jun. 17, 2011 (DE) .......................... 10 2011 077 750

(51) Int. Cl.
*B60G 3/18* (2006.01)
(52) U.S. Cl.
USPC .................................................. 280/124.136
(58) Field of Classification Search
CPC ........ B60G 3/20; B60G 3/26; B60G 2200/44; B60G 2200/46; B60G 2200/462; B60G 2200/464; B60G 2200/182; B60G 21/005; B60G 7/00; B60G 7/001
USPC .................... 280/124.134, 124.135, 124.136, 280/124.137, 124.138, 124.143, 86.75, 280/86.751, 86.754, 86.757, 86.758
See application file for complete search history.

(56) References Cited

U.S. PATENT DOCUMENTS 2,071,577 A * 2/1937 Renwick et al. .............. 267/230
2,696,388 A * 12/1954 Kishline et al. ........ 280/124.143
(Continued)

FOREIGN PATENT DOCUMENTS

DE 38 27 039 A1 2/1990
DE 39 26 665 A1 2/1990
(Continued)

OTHER PUBLICATIONS

International Search Report (PCT/ISA/210) with partial English translation dated Aug. 23, 2012 (Eight (8) pages).
(Continued)

*Primary Examiner* — Faye M. Fleming
(74) *Attorney, Agent, or Firm* — Crowell & Moring LLP

(57) ABSTRACT

A swivel bearing of a wheel suspension is connected to a longitudinal control arm via two joints at different heights viewed in a longitudinal direction of the vehicle, in an articulated manner such that the joints determine a steering axis of rotation extending primarily perpendicularly when viewed from the side, and which has a negative scrub radius. Each transverse control arm is attached to the longitudinal control arm via one rubber mount or joint having a minimal degree of rotary freedom. The swivel bearing is guided by a tie rod, which is supported on a soft rubber bearing. The tie rod is connected to an actuator adjuster element, whose actuator is arranged substantially in a center of the vehicle and acts for the two rear wheels thereof. The tie rod is moveable substantially in the transverse direction to minimally steer the rear wheel.

12 Claims, 4 Drawing Sheets

(56) References Cited

U.S. PATENT DOCUMENTS

| | | | |
|---|---|---|---|
| 4,978,131 A | 12/1990 | Edahiro et al. | |
| 5,000,477 A | 3/1991 | Minakawa et al. | |
| 5,102,159 A | 4/1992 | Sato et al. | |
| 5,513,874 A * | 5/1996 | Mori | 280/93.51 |
| 6,752,409 B1 * | 6/2004 | Kunert | 280/124.138 |
| 6,938,908 B2 * | 9/2005 | Oda et al. | 280/124.109 |
| 7,048,286 B2 * | 5/2006 | Eppelein | 280/124.106 |
| 7,703,565 B2 * | 4/2010 | Ikenoya et al. | 180/65.51 |
| 7,926,846 B2 * | 4/2011 | Tanaka et al. | 280/781 |
| 8,215,653 B2 | 7/2012 | Siebeneick | |
| 8,579,310 B2 * | 11/2013 | Tanaka et al. | 280/124.135 |

FOREIGN PATENT DOCUMENTS

| | | | | |
|---|---|---|---|---|
| DE | 39 39 312 A1 | 5/1990 | | |
| DE | 38 75 336 T2 | 3/1993 | | |
| DE | 38 79 447 T2 | 7/1993 | | |
| DE | 41 29 643 C2 | 1/1996 | | |
| DE | 10 2006 016 762 A1 | 10/2007 | | |
| DE | 10 2006 055 294 A1 | 5/2008 | | |
| DE | 10 2006 055 295 A1 | 5/2008 | | |
| EP | 0 052 153 B1 | 7/1984 | | |
| EP | 0 323 414 A1 | 7/1989 | | |
| EP | 0 323 815 A1 | 7/1989 | | |
| JP | 59014507 A * | 1/1984 | | B60G 19/02 |
| JP | 60060018 A * | 4/1985 | | B60G 3/28 |
| JP | 62-110506 | 5/1987 | | |
| JP | 01044308 A * | 2/1989 | | B60G 3/20 |

OTHER PUBLICATIONS

German Search Report with partial English translation dated Jan. 11, 2012 (Ten (10) pages).

* cited by examiner

INDEPENDENT WHEEL SUSPENSION OF AN AT LEAST SLIGHTLY STEERABLE REAR WHEEL OF A DOUBLE-TRACK VEHICLE

CROSS REFERENCE TO RELATED APPLICATIONS

This application is a continuation of PCT International Application No. PCT/EP2012/058249, filed May 4, 2012, which claims priority under 35 U.S.C. §119 from German Patent Application No. DE 10 2011 077 750.4, filed Jun. 17, 2011, the entire disclosures of which are expressly incorporated by reference herein.

This application contains subject matter related to U.S. application Ser. No. 14/051,741, entitled "Vehicle Independent Wheel Suspension for a Slightly Steerable Rear Wheel of a Double-Track Vehicle", filed on even date herewith.

BACKGROUND AND SUMMARY OF THE INVENTION

The invention relates to a single wheel suspension of a rear wheel, the same being steerable, at least minimally, by way of an actuator, of a vehicle having two wheel paths (a double-track vehicle). The swivel bearing (also known as a wheel carrier) of the suspension which carries the wheel is guided by a longitudinal control arm which extends substantially in the longitudinal direction of the vehicle, as well as by two transverse control arms which extend primarily in the transverse direction of the vehicle, with the sweep thereof oriented forward and toward the inside. The two transverse control arms are positioned in different planes when viewed in the longitudinal direction of the vehicle, wherein the ends of the transverse control arms which face away from the swivel bearing are connected either directly or indirectly to the vehicle construction in a manner allowing at least minimal articulation. Reference is hereby made to DE 41 29 643 C2, and particularly to DE 38 27 039 A1, as relevant prior art.

DE 41 29 643 C2 discloses an example of what is also called a central pivot axle among specialists, and this is characterized by an advantageous kinematic behavior, particularly when used in a driven wheel, and is also more advantageous than the known, so-called semi-trailing arm axle. DE 38 27 039 A1 shows one option for making it possible for a wheel guided in such a manner to be minimally steered. In this case, the toe angle of this wheel can be adjusted by use of an actuator which suitably engages with a bearing of the longitudinal control arm, said bearing being positioned on the vehicle construction. This known arrangement requires additional constructed space, not only at the position of the longitudinal control arm bearing on the vehicle construction, but also in the immediate proximity of the longitudinal control arm, for the horizontal articulation thereof (in the transverse direction of the vehicle). Depending on the form of the vehicle construction in this region, such constructed space may not be available. In addition, it is disadvantageous that two actuators are needed to steer the two rear wheels in the case of a vehicle with two wheel paths. This is not only costly and time consuming, but also difficult to realize in terms of control technology.

In the present case, the problem is that of detailing an improved single wheel suspension and/or vehicle axle, while preserving the advantageous fundamental kinematic and elastokinematic properties, as well as essential dimensions.

This solution to this problem is characterized in that the swivel bearing is connected to the longitudinal control arm, by way of two bearings or joints (the bearings or joints may be referred to herein simply as joints) which are positioned at different heights, when viewed in the longitudinal direction of the vehicle, in such an articulated manner that these bearings or joints describe a steering axis which primarily runs perpendicularly when viewed laterally, and which has a negative scrub radius for the wheel. Each transverse control arm is attached to the longitudinal control arm via one rubber mount or at least one joint having at least one minimal degree of rotary freedom. The swivel bearing is further guided by a tie rod, and supported on a soft rubber bearing, said tie rod being connected to an adjuster element of an actuator, the same being arranged substantially in the center of the vehicle and acting for the two rear wheels thereof, wherein the tie rod can be moved substantially in the transverse direction of the vehicle.

According to the invention, in contrast to DE 38 27 039 A1 discussed above, an independent longitudinal axis of rotation is formed by the transverse control arm joints on the side of the wheel, and the additional degree of freedom created in this manner is bound by a tie rod which engages with the wheel carrier (which is now called a swivel bearing), but which functionally is nothing other than a wheel carrier which is able to swivel about this longitudinal axis of rotation with respect to the longitudinal control arm. The now additional tie rod of the first rear wheel of the vehicle is connected to an adjuster element of what below is also called a steering actuator, and the other second rear wheel of the vehicle is likewise connected via a tie rod to an adjuster element of the same (steering) actuator. This adjuster element, or optionally two adjuster elements of the single actuator according to the invention, which is configured for both rear wheels and is arranged substantially centrally, can be a rod which can move in a transverse direction of the vehicle, by way of example, similarly to a gear rack in the front wheel steering of a passenger vehicle. The actuator can be arranged close to the inner articulation of the two transverse control arms on the vehicle body, or close to an axle carrier, or the like, and therefore requires little additional constructed space.

As mentioned above, the swivel bearing has one degree of rotary freedom, substantially about the vertical axis, with respect to the longitudinal control arm. This degree of rotary freedom can be realized by a hinge joint or by two ball joints, or by equivalent mounts or joints. An adjusting movement of the actuator leads via the tie rod to a rotation of the swivel bearing about the longitudinal axis of rotation, and therefore to a steering angle applied to the wheel which itself is rotatably mounted about its axis of rotation on the swivel bearing. By way of example, the bolting of the two outer transverse control arm bearings can be utilized for constructing said longitudinal axis of rotation, for example by attaching two ball joints, which define this longitudinal axis of rotation, onto the longitudinal control arm, as shown in principle in German patent application DE 102011007283.7. These two ball joints or other joints included for the purpose of realizing the longitudinal axis of rotation advantageously sit in front of the two outer transverse control arm bearings, when viewed in the direction of travel of the vehicle, to configure the longitudinal axis of rotation as close to the center of the wheel as possible, thereby producing an effectively small caster distance. As such, the configuration ensures a minimal transverse offset of the wheel contact point during the steering movement.

As is known, a central pivot axle is characterized by a stabilizing behavior when subjected to braking forces acting on the wheel, given a suitable design of the longitudinal control arm bearing positioned on the vehicle body. As a result of the fact that, as described particularly in EP 0 052

153 B1, the longitudinal control arm bearing on the vehicle body has greater stiffness in a first direction which extends to a large degree in the longitudinal direction of the vehicle (typically this is the radial direction of the bearing) than in the direction of the bearing which is perpendicular thereto and which extends to a large degree in the transverse direction of the vehicle (typically the axial direction of the bearing), there is a direction of displacement of the longitudinal control arm bearing point on the vehicle construction, substantially perpendicular to the two transverse control arms and minimally toward the same, when a braking force is applied. As a result, the wheel undergoes a slight toe-in. The sweep of the two transverse control arms oriented forward and inward—chosen for reasons of space—also works against this movement.

So that, at this point, the tie rod does not obstruct this stabilizing behavior of a central pivot axis, it would be desirable to arrange the tie rod as parallel as possible—when viewed from above—to the two transverse control arms; however, for the most part, this is not feasible due to reasons of space. In order to make it possible to realize an advantageous stabilizing behavior of such a steerable central pivot axis using a tie rod, nevertheless, first a relatively soft rubber bearing is included in the functional chain of the tie rod, meaning between the swivel bearing and the tie rod and/or between the tie rod and the adjusting element of the actuator, wherein relatively soft rubber bearings are those which have a stiffness less than 5000 N/mm. Moreover, by realizing a negative scrub radius on a single wheel suspension according to the invention, the configuration ensures that the wheel continues to acquire toe-in when subjected to braking force. This negative scrub radius in this case can be implemented by a suitable arrangement of the joint or the like which determines the longitudinal axis of rotation.

Finally, the tie rod can optionally be arranged with a sweep facing at least slightly forward and inside, even if the magnitude of the sweep, meaning the sweep angle with respect to the transverse direction of the vehicle, will typically be smaller than that of the two transverse control arms. In addition, it has been recognized that a favorable toe-in (=the profile of the toe-in via the wheel hub) can be realized if the tie rod rises from the adjusting element of the actuator to the swivel bearing to a small degree—meaning if the joint between the tie rod and the actuator adjusting element is slightly lower with respect to the driving surface than the opposite joint of the tie rod, wherein the tie rod is connected to the swivel bearing via the opposite end thereof, preferably with a so-called steering arm connected in-between, the same being a component of the swivel bearing and/or rigidly connected to the same.

As already mentioned, the longitudinal control arm bearing positioned on the side of the vehicle construction on typical central pivot axles has higher stiffness in a first direction in which the greater part of the same extends in the longitudinal direction of the vehicle (=typically the radial direction of the bearing) than in the direction perpendicular thereto in which the greater part extends in the transverse direction of the vehicle (=typically the axial direction of the bearing). In the case of typical, non-steerable central pivot axles, the ratio of this stiffness can be in the range of 7:1. In the case of a steerable central pivot axle according to the invention, such flexibility of the longitudinal control arm bearing in the transverse direction of the vehicle is no longer necessary, because the desired "assumption of toe-in" of the wheel when subjected to braking force at this point is realized by the negative scrub radius. At this point, the longitudinal control arm bearing positioned on the side of the vehicle body can be designed to support the above configuration, while advantageously realizing an increased lateral guidance, to such a degree that the stiffness thereof in the first direction (the radial direction of the bearing) is not more than three times as large as the stiffness of the second direction, the same extending with the larger part thereof in the transverse direction of the vehicle (=the axial direction of the bearing).

In addition, it has been recognized that it is also possible to influence the toe-in curve (=the profile of the toe-in via the wheel hub) in a desired manner via the distance of the outer tie rod articulation point—meaning the point thereof facing opposite the wheel—from the instantaneous axis of a single wheel suspension according to the invention, said instantaneous axis being known to be determined by the longitudinal control arm bearing at the end closest to the vehicle body, as well as the pins of the two transverse control arms. Here, the deviation of the toe-in curve of a similar, but nevertheless non-steerable single wheel suspension must be larger in proportion to how far the instantaneous axis can move away from the outer tie rod articulation point when the wheel compresses and extends the suspension with respect to the vehicle body. It would be desirable to achieve the least possible effect of the tie rod and/or said tie rod articulation point on the toe-in curve, said effect occurring if the outer tie rod articulation point would be positioned in the longitudinal control arm bearing at the end closest to the vehicle construction—which nevertheless is not recommended for multiple reasons, as stated above. In contrast, an arrangement of the tie rod together with the actuator closer to the wheel axis, which is advantageous in regards to a short path of travel for actuator movements, causes deviations from the toe-in curve of a similar, non-steerable single wheel suspension. These deviations, however, can be suitably taken into account during the constructive orientation of the instantaneous axis, such that the resulting toe-in curve once again corresponds to the original design, particularly for a similar, non-steerable single wheel suspension.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
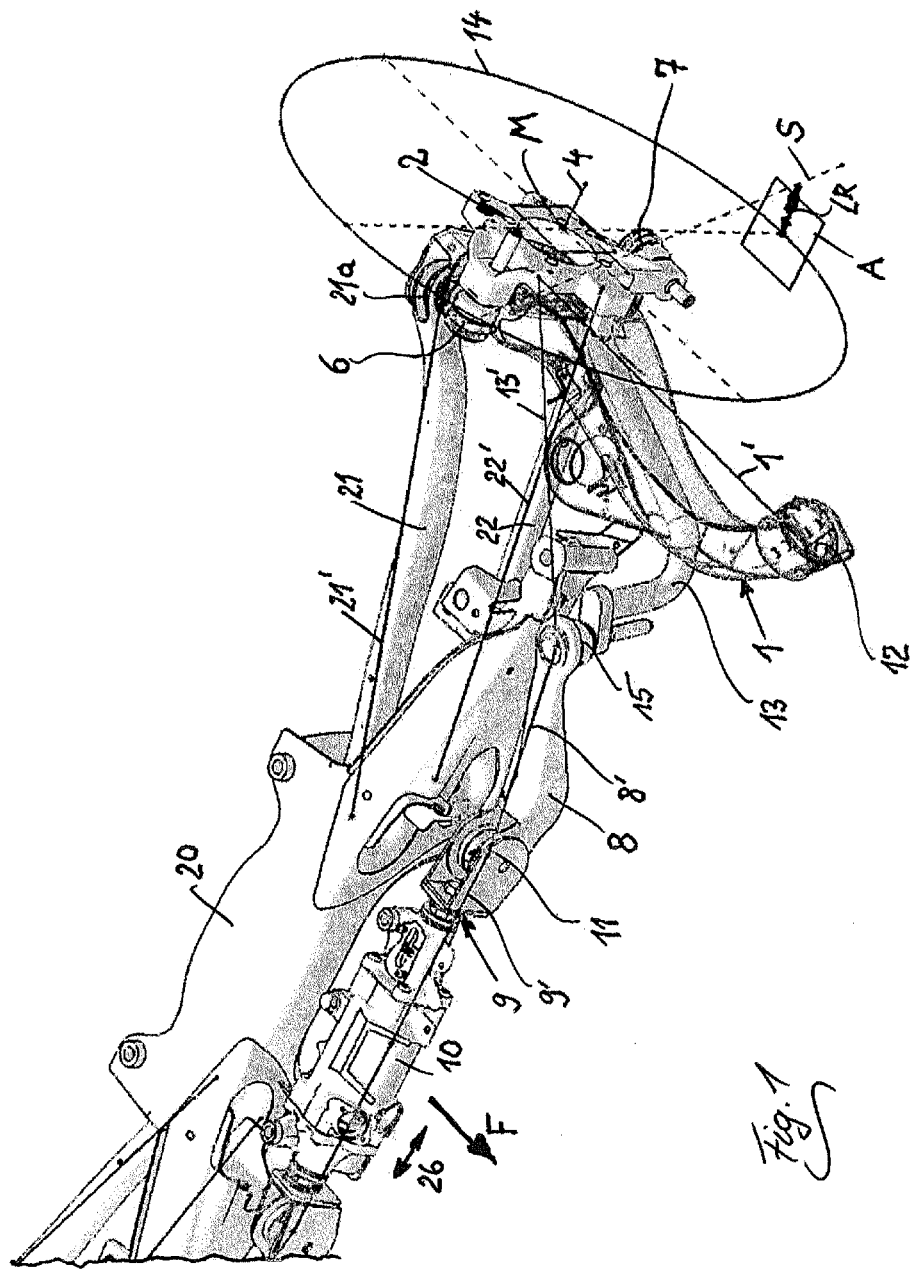
FIG. 1 is a spatial view of the left half of a rear axle according to an embodiment of the invention of a passenger vehicle, viewed substantially in the direction of travel, and having a single wheel suspension.

First, with reference to FIG. 1, a longitudinal control arm is indicated by the reference number 1, and guides the wheel 14 (which is only illustrated by its periphery in the central plane of the wheel). The longitudinal control arm 1 is attached on a wheel hub as usual, together with an upper transverse control arm 21 which is clearly visible, and a lower transverse control arm 22 with lies substantially below the upper transverse control arm 21. This wheel hub is mounted via a wheel bearing as usual in a wheel carrier 2, which in the present case is termed a swivel bearing 2. The wheel hub and/or the wheel can be driven—meaning set in rotation about the wheel axis of rotation 4 by a drive shaft, which is not shown here.

The longitudinal control arm 1 which extends substantially in the longitudinal direction of the vehicle and/or the direction of travel F, which is illustrated as an arrow in the longitudinal central plane of the vehicle and/or the rear axis, is articulated by its front end, via a bearing 12, on the vehicle body, which is not shown, in such a manner that compression and extension movements of the wheel 14 are enabled in the vertical direction. A bearing plate structure which cannot be seen in detail is included on the end region of the longitudinal control arm 1 which is closest to the wheel, and extends vertically to such an extent that two bearings or joints 6, 7 are attached on this bearing plate structure above and below the wheel center M, via which the swivel bearing 2 is connected to the longitudinal control arm 1 in such an articulated manner that these joints 6, 7 determine a steering axis of rotation S which in any case runs primarily perpendicularly when viewed from the side, and about which the swivel bearing 2 is able to swivel relative to the longitudinal control arm 1. In addition, the joints 21*a*, 22*a* of the two transverse control arms 21, 22, said joints being those closest to the wheel, are attached above and/or below the wheel center M via mounting links which are machined from the bearing plate structure. (A similar construction which nevertheless does not accord with the present embodiment in detail is shown in the Applicant's German patent application DE 102011007283.7).

The two transverse control arms 21, 22, discussed above, extend primarily in the transverse direction of the vehicle, but in this case, in the top view, with a certain sweep forward and to the inside (cf. FIG. 3; sweep angle=the angle with respect to the transverse direction of the vehicle, approx 20°), and— as is typical of central pivot axles, the two transverse control arms 21, 22 nearly align with each other when viewed from the top. As usual, the two transverse control arms 21, 22 lie in different planes when viewed in the longitudinal direction of the vehicle (cf. FIG. 2), and in this case above (transverse control arm 21) and below (transverse control arm 22) the wheel center M, wherein the transverse control arms 21, 22 only extend toward the center of the vehicle to such an extent that they do not intersect. As is usual, the ends of the transverse control arms 21, 22 which are opposite the wheel in FIG. 1, and which are not visible, are mounted in an axle carrier 20.

Of course, the additional degree of freedom of this wheel suspension, created by the steering axis of rotation S relative to a conventional central pivot axle, must be bound, and a tie rod 8 is configured for this purpose. In the present case, the tire rod 8 is linked on one end thereof to a steering arm 13 which is fixed to the swivel bearing 2 and therefore effectively forms a component of the same, and on the other end to an adjusting element 9 of a steering actuator 10—also just termed the actuator 10—by which the wheel can be steered by way of a suitable controller—meaning that a desired toe angle of the wheel can be set. For this purpose, the adjusting element 9 is moved according to arrow 26 in the transverse direction of the vehicle. In this case, the actuator 10 is arranged substantially centrally between the two rear wheels of the vehicle and/or on the axle carrier 20, and sheathes, over a further region, the adjusting element 9, which acts for both wheels of the vehicle and/or the rear axle thereof, and is designed in the form of a gear rack, by way of example. In this case, only the end-face recess for the tie rod 8 is shown. A soft rubber bearing 11 (with a stiffness lower than 5000 N/mm) is included in the at least slightly articulated connection between the adjusting element 9 and the tie rod 8.

In order to keep the constructed space requirements as low as possible, the steering arm 13 runs, at least in sections, inside the longitudinal control arm 1, the same accordingly designed as hollow, wherein suitable openings are naturally included in the two side walls of the longitudinal control arm 1 for the same, through which the steering arm 13 can enter and/or exit this hollow space through the openings while maintaining a sufficient clearance for the relative movement thereof with respect to the longitudinal control arm 1 in the hollow space thereof. In order to make this visible, the longitudinal control arm 1 in the figures is illustrated as effectively transparent.

Not only in FIG. 1, but also in the further figures, in addition to the actual components which guide the wheel, the so-called function lines thereof are also illustrated, and are indicated with the corresponding reference numbers having a prime apostrophe. As such, the kinematic action of the steering arm 13, by way of example, can be illustrated by the steering arm function line 13'. In addition, the wheel contact surface A is illustrated in FIGS. 1 and 3 by a square.

Figure 2:
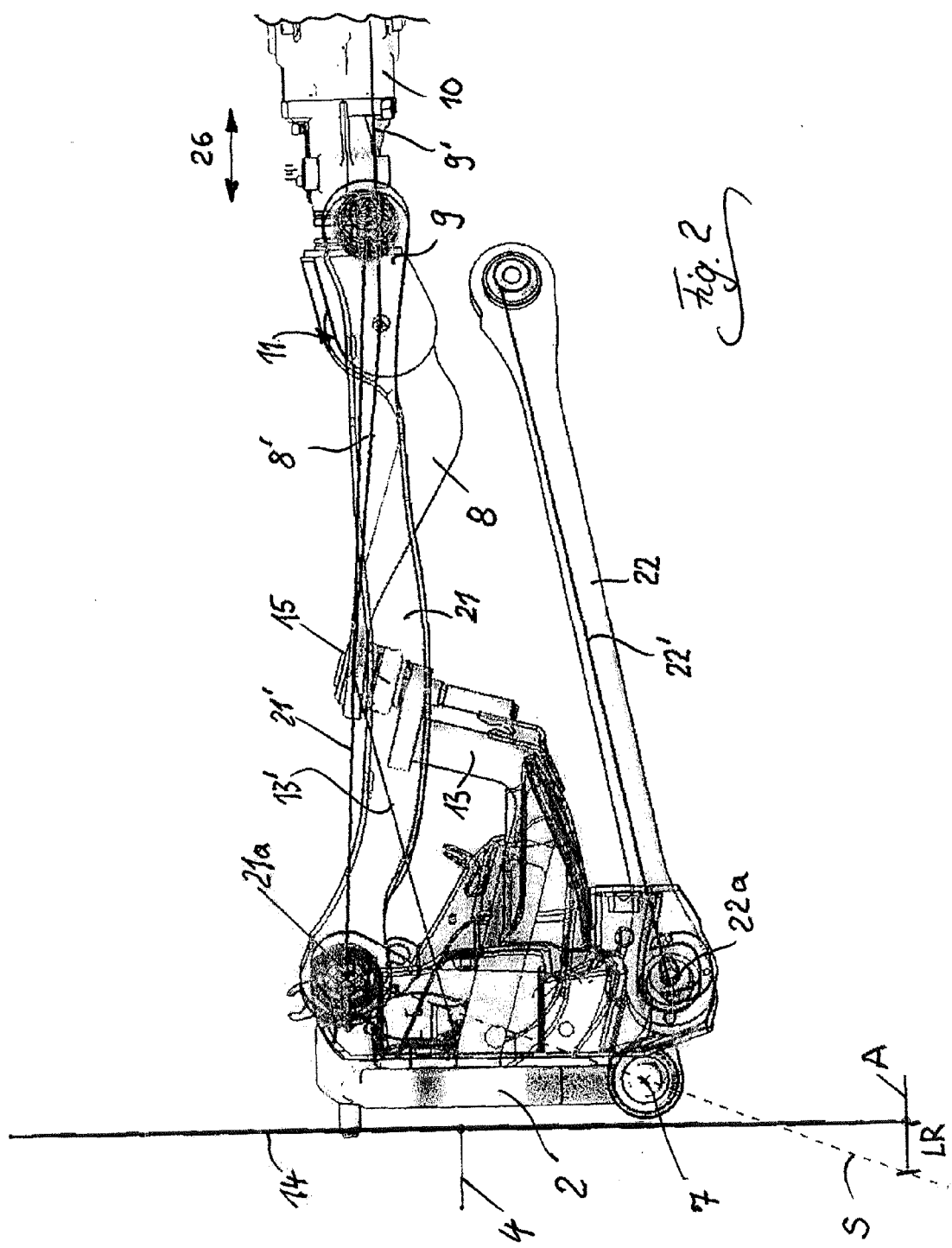
FIG. 2 is a view of part of FIG. 1 in the direction of travel from behind.

In FIG. 2, it can be clearly seen that the longitudinal axis of rotation S runs, as a result of a suitable arrangement of the two joints 6, 7, of which only the lower joint 7 can be seen here, in such a manner that a negative scrub radius LR results—in the present case in the range of 35 mm, measured as usual on the wheel contact surface A and/or the travel surface. The positive kingpin inclination of the longitudinal axis of rotation S in this case is approx. 20°. In addition, in this view, it can be seen that the tie rod 8, and more precisely the function line 8' thereof, rises to a small degree proceeding from the rubber bearing 11 and/or the articulation point with the adjusting element 9 as it runs outward toward the steering arm 13. In FIG. 2, the upper transverse control arm 21 is drawn transparently in order to make the connection between the steering arm 13 and the tie rod 8 via a ball joint 15 visible, said connection being further forward in the direction of travel F.

Figure 3:
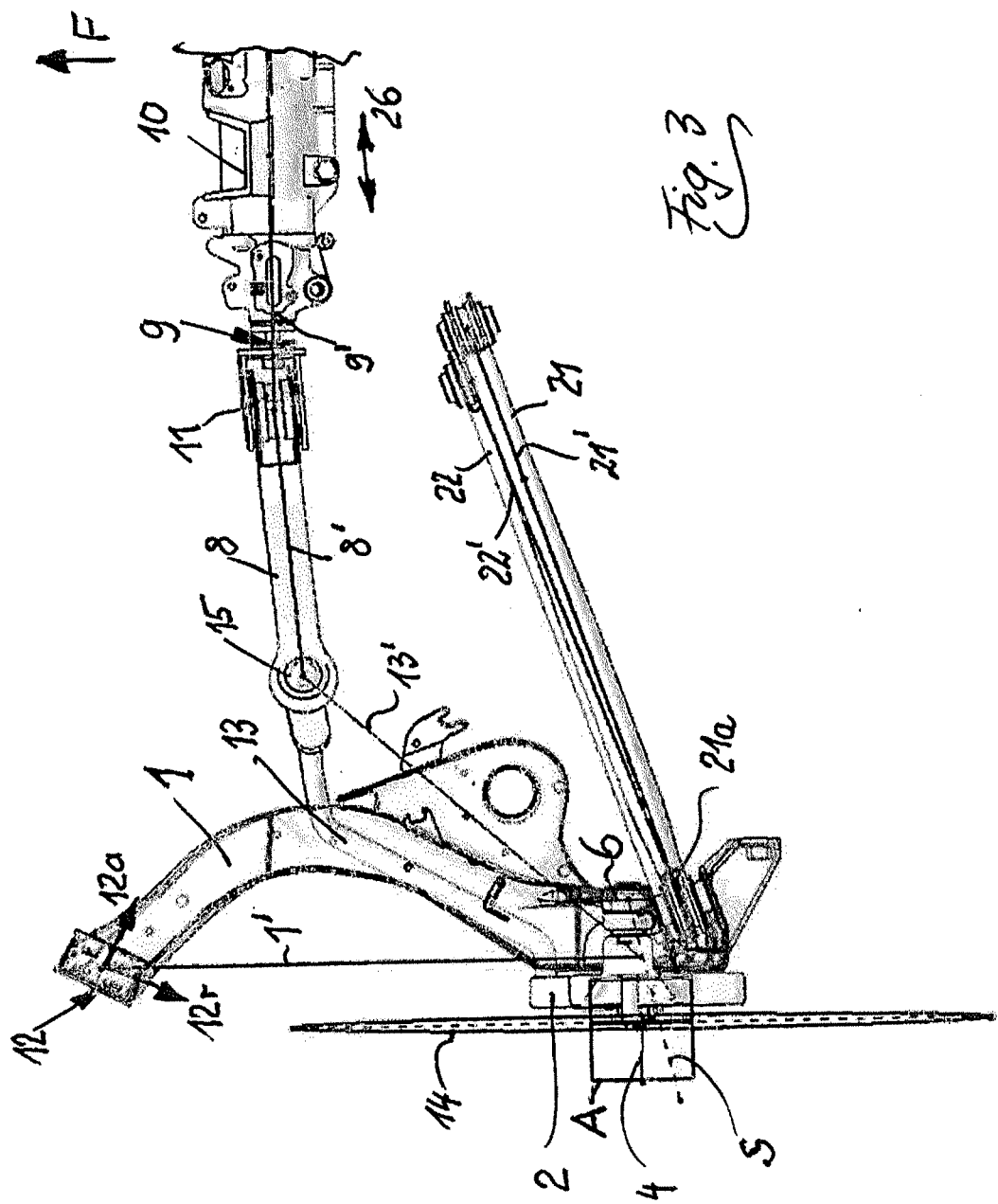
FIG. 3 is a top view of part of FIG. 1 in the direction of the travel surface.

In FIG. 3, it can particularly be seen that the tie rod 8 and the function line 8' thereof run with a sweep which is oriented identically to that of the transverse control arms 21, 22, but which has a significantly smaller sweep angle. In addition, in FIG. 3, the different stiffnesses of the longitudinal control arm bearing 12 on the end closest to the vehicle body construction are illustrated by arrows—particularly the stiffness 12*a* in the axial direction of the bearing 12, which extends to a larger degree in the transverse direction of the vehicle, and the stiffness 12*r* which extends to a larger degree in the longitudinal direction of the vehicle. (This longitudinal direction is oriented the same as the direction of travel F). In one concrete embodiment, the radial stiffness (12*r*) is approximately 1.5-times the axial stiffness (12*a*). Also, the wheel periphery in FIG. 3 is shown as an ellipse in the central plane (=wheel 14), due to the wheel camber.

Figure 4:
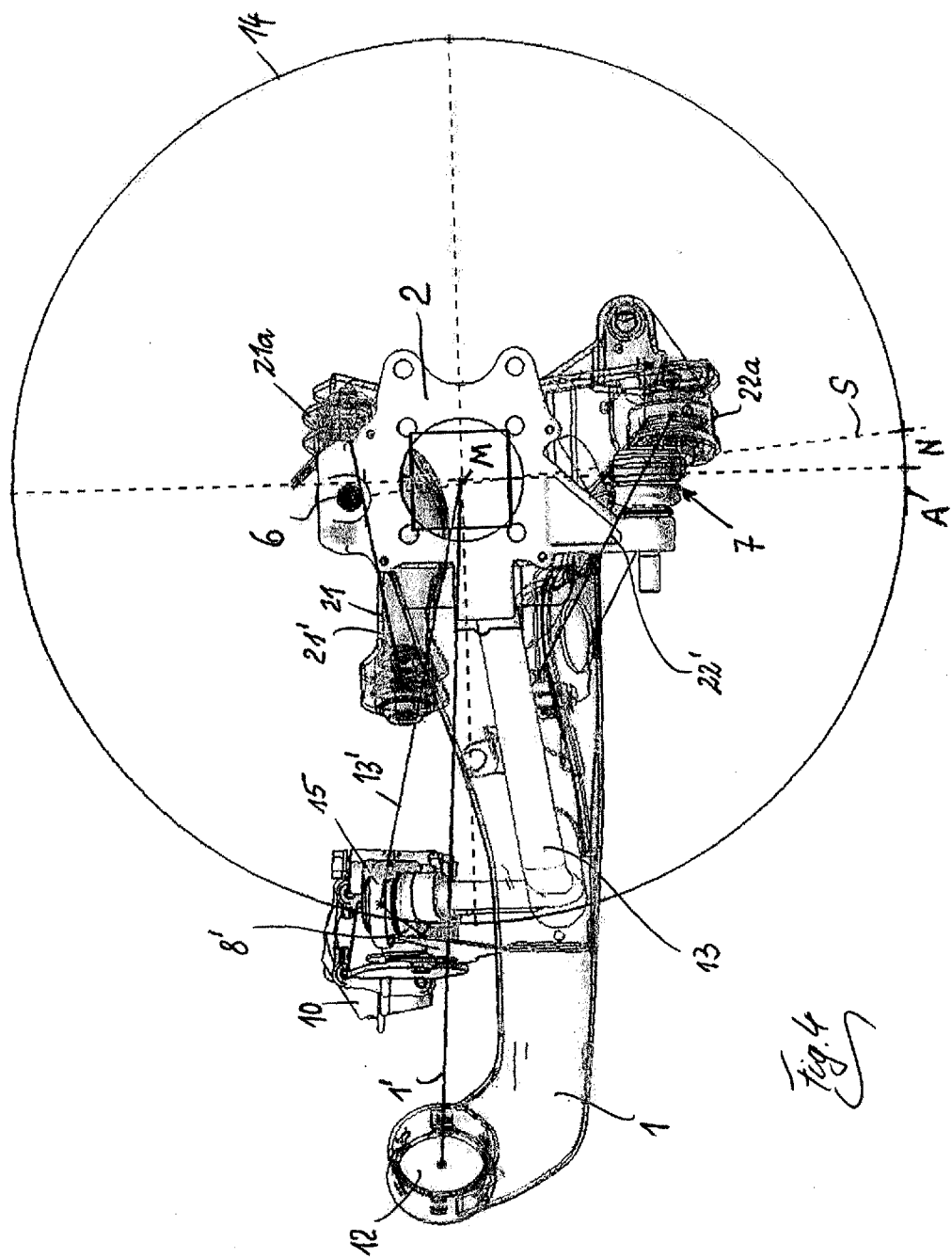
FIG. 4 is a side view of part of FIG. 1 from the outside.

FIG. 4 shows the small caster distance N resulting from a suitable positioning of the joints 6, 7 which determine the longitudinal axis of rotation S. In fact, there is negative caster in this case, which nevertheless is desirable for the stabilization of the driving behavior when lateral forces are applied— particularly that the wheel assumes negative caster.

By means of a single wheel suspension according to the invention, it is possible to achieve a steering movement of the wheel on a central pivot axle, using a single steering actuator 10, without restricting the base functionality of such a central pivot axle carrying a wheel which is not typically steerable, and without requiring disproportionately much constructed space for the steering actuator unit. Due to the identical connections to the vehicle body construction, a simple interchangeability results with the unarticulated axle; likewise, there is the option for a driven, steerable axle.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An independent wheel suspension of an at least minimally steerable rear wheel of a double-track vehicle, comprising:
    an actuator operatively configured for steering the rear wheel;
    a swivel bearing on which the rear wheel is carried;
    a longitudinal control arm extending substantially in a longitudinal direction of the vehicle;
    two transverse control arms extending substantially in a transverse direction of the vehicle, the two transverse control arms being positioned in different planes viewed in the longitudinal direction of the vehicle;
    wherein the swivel bearing is guided by the longitudinal control arm and by the two transverse control arms, ends of the two transverse control arms facing away from the swivel bearing being connected in an articulated manner either directly or indirectly to a body of the vehicle;
    two joints configured to provide an articulated connection of the swivel bearing to the longitudinal control arm, the two joints being at different heights viewed in the longitudinal direction of the vehicle, wherein the two joints define a longitudinal axis of rotation which runs substantially perpendicular when viewed from a side and which has a negative scrub radius;
    wherein each transverse control arm is attached at its other end to the longitudinal control arm via a joint having at least one minimal degree of rotary freedom;
    a tie rod configured to guide the swivel bearing, the tie rod being supported on a soft rubber bearing and being connected to an adjuster element of the actuator;
    wherein the actuator is arranged substantially in a center of the vehicle and is operatively configured to act for two rear wheels of the vehicle, the tie rod being moveable substantially in a transverse direction of the vehicle.

2. The wheel suspension according to claim 1, wherein the tie rod extends with a slight sweep forward and inward.

3. The wheel suspension according to claim 1, further comprising:
    a steering arm constructed on the swivel bearing for linking the tie rod to the swivel bearing; and
    wherein the steering arm is arranged such that the tie rod rises at least slightly from one end at the adjusting element of the actuator to another end at the steering arm.

4. The wheel suspension according to claim 2, further comprising:
    a steering arm constructed on the swivel bearing for linking the tie rod to the swivel bearing; and
    wherein the steering arm is arranged such that the tie rod rises at least slightly from one end at the adjusting element of the actuator to another end at the steering arm.

5. The wheel suspension according to claim 1, wherein:
    a bearing of the longitudinal control arm on the body of the vehicle has a greater stiffness in a first direction extending to a larger degree in the longitudinal direction of the vehicle than in a second direction perpendicular thereto and extending to a larger degree in the transverse direction of the vehicle;
    the stiffness in the first direction being not more than three times the stiffness in the second direction.

6. The wheel suspension according to claim 2, wherein:
    a bearing of the longitudinal control arm on the body of the vehicle has a greater stiffness in a first direction extending to a larger degree in the longitudinal direction of the vehicle than in a second direction perpendicular thereto and extending to a larger degree in the transverse direction of the vehicle;
    the stiffness in the first direction being not more than three times the stiffness in the second direction.

7. The wheel suspension according to claim 3, wherein:
    a bearing of the longitudinal control arm on the body of the vehicle has a greater stiffness in a first direction extending to a larger degree in the longitudinal direction of the vehicle than in a second direction perpendicular thereto and extending to a larger degree in the transverse direction of the vehicle;
    the stiffness in the first direction being not more than three times the stiffness in the second direction.

8. The wheel suspension according to claim 1, wherein the two joints defining the longitudinal axis of rotation are arranged such that an effectively small caster distance results.

9. The wheel suspension according to claim 2, wherein the two joints defining the longitudinal axis of rotation are arranged such that an effectively small caster distance results.

10. The wheel suspension according to claim 3, wherein the two joints defining the longitudinal axis of rotation are arranged such that an effectively small caster distance results.

11. The wheel suspension according to claim 5, wherein the two joints defining the longitudinal axis of rotation are arranged such that an effectively small caster distance results.

12. The wheel suspension according to claim 3, wherein the steering arm extends, at least in a section thereof, in a hollow interior of the longitudinal control arm.

* * * * *